United States Patent [19]
Ottinger et al.

[11] 3,895,087
[45] July 15, 1975

[54] METHOD OF MANUFACTURING A MOLDED COMPOSITE URETHANE FOAM STRUCTURAL PANEL

[75] Inventors: Lester V. Ottinger, Danbury, Conn.; William A. Matzke, Mahopac, N.Y.

[73] Assignee: Champion International Corporation, New York, N.Y.

[22] Filed: Nov. 26, 1971

[21] Appl. No.: 202,180

[52] U.S. Cl. .............. 264/46.2; 52/309; 52/314; 161/124; 161/159; 161/160; 161/166; 264/89; 264/45.8; 264/46.8; 264/92; 264/93; 264/309; 425/4 C; 425/134; 425/224; 425/388
[51] Int. Cl. .......................................... B29d 27/04
[58] Field of Search .......... 264/45, 47, 54, 101, 53, 264/88, 90, 92, 308, 309; 52/309, 314; 161/124, 159, 160, 166; 425/4 C, 134, 425/224, 388

[56] References Cited
UNITED STATES PATENTS

| | | | |
|---|---|---|---|
| 2,586,275 | 2/1952 | Toulmin | 264/46 |
| 2,779,689 | 1/1957 | Reis | 264/54 X |
| 3,009,209 | 11/1961 | Weinbrenner et al. | 264/54 |
| 3,081,487 | 3/1963 | Heffner et al. | 264/54 X |
| 3,091,551 | 5/1963 | Robertson | 117/105.5 |
| 3,096,001 | 7/1963 | Boe et al. | 117/104 R X |
| 3,144,492 | 8/1964 | Lightner et al. | 264/53 X |
| 3,154,605 | 10/1964 | Meyer et al. | 264/53 |
| 3,174,887 | 3/1965 | Voelker | 264/45 |
| 3,187,069 | 6/1965 | Pincus et al. | 264/90 X |
| 3,193,406 | 7/1965 | Mittelman | 264/88 X |
| 3,197,531 | 7/1965 | Wilbur | 264/88 |
| 3,216,849 | 11/1965 | Jacobs | 264/54 X |
| 3,226,457 | 12/1964 | Smith | 264/47 X |
| 3,229,005 | 1/1966 | Reifenhauser | 264/47 |
| 3,249,304 | 5/1966 | Faro et al. | 117/105.5 X |
| 3,366,718 | 1/1968 | Komada | 264/54 X |
| 3,550,673 | 12/1970 | Gallagher et al. | 161/190 X |
| 3,647,588 | 3/1972 | Greig | 264/47 X |
| 3,657,036 | 4/1972 | Mullenhoff et al. | 264/47 X |
| 3,668,288 | 6/1972 | Takahashi | 264/47 |

FOREIGN PATENTS OR APPLICATIONS

| | | | |
|---|---|---|---|
| 242,067 | 1/1963 | Australia | 264/47 |
| 745,121 | 10/1966 | Canada | 264/47 |
| 760,937 | 6/1967 | Canada | 117/104 R |
| 1,164,323 | 9/1969 | United Kingdom | 161/161 |

OTHER PUBLICATIONS

Brydson, J. A., "Plastics Materials," Princeton, N.J., D. Van Nostrand, c 1966, pp. 349–351.
"Kirk–Othmer Encyclopedia of Chemical Technology," Second Completely Revised Edition, Vol. 21, New York, Interscience, c 1970, pp. 88–106.
Bender, Rene J., "Handbook of Foamed Plastics," Libertyville, Ill., Lake Publishing Corp., c 1965, page 150.

*Primary Examiner*—Philip E. Anderson
*Attorney, Agent, or Firm*—Evelyn M. Sommer, Esq.; James M. Heilman, Esq.; Anthony J. Casella, Esq.

[57] ABSTRACT

The invention covers a high quality structural building panel comprising a unique construction of high density and low density urethane foam faced with a weather resistant plastic film or sheet material surface, and with the method of manufacture wherein the supporting urethane foam is molded onto the film instead of laminating the film onto the supporting substrate.

20 Claims, 4 Drawing Figures

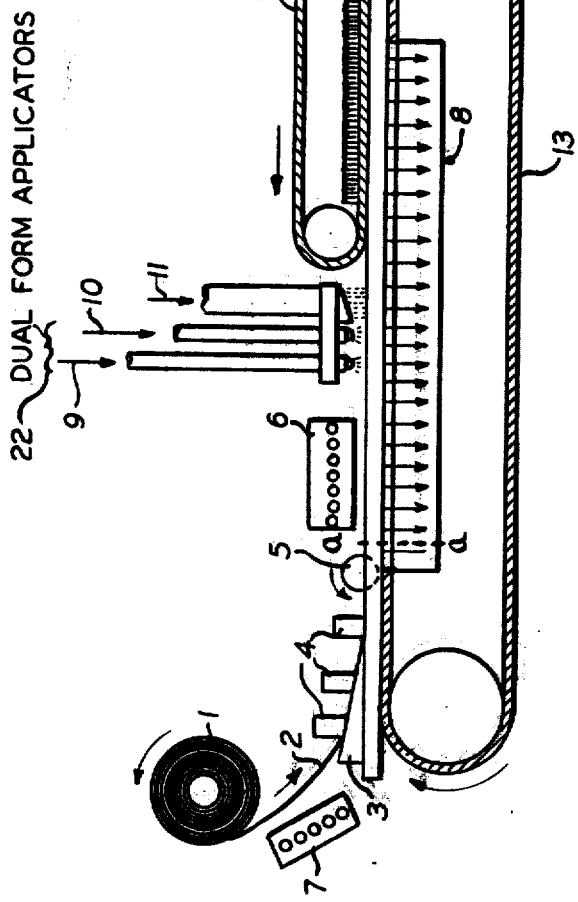
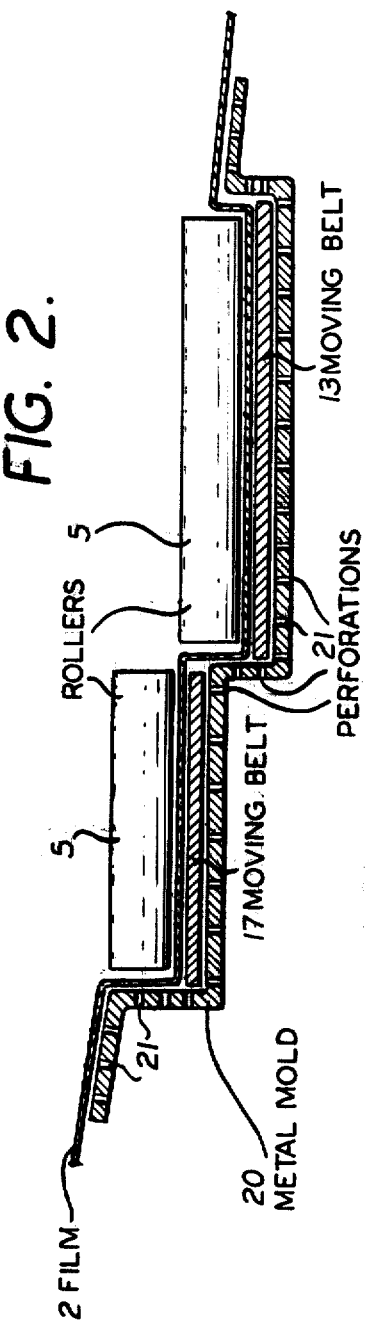
INVENTORS
LESTER V. OTTINGER
WILLIAM A. MATZKE

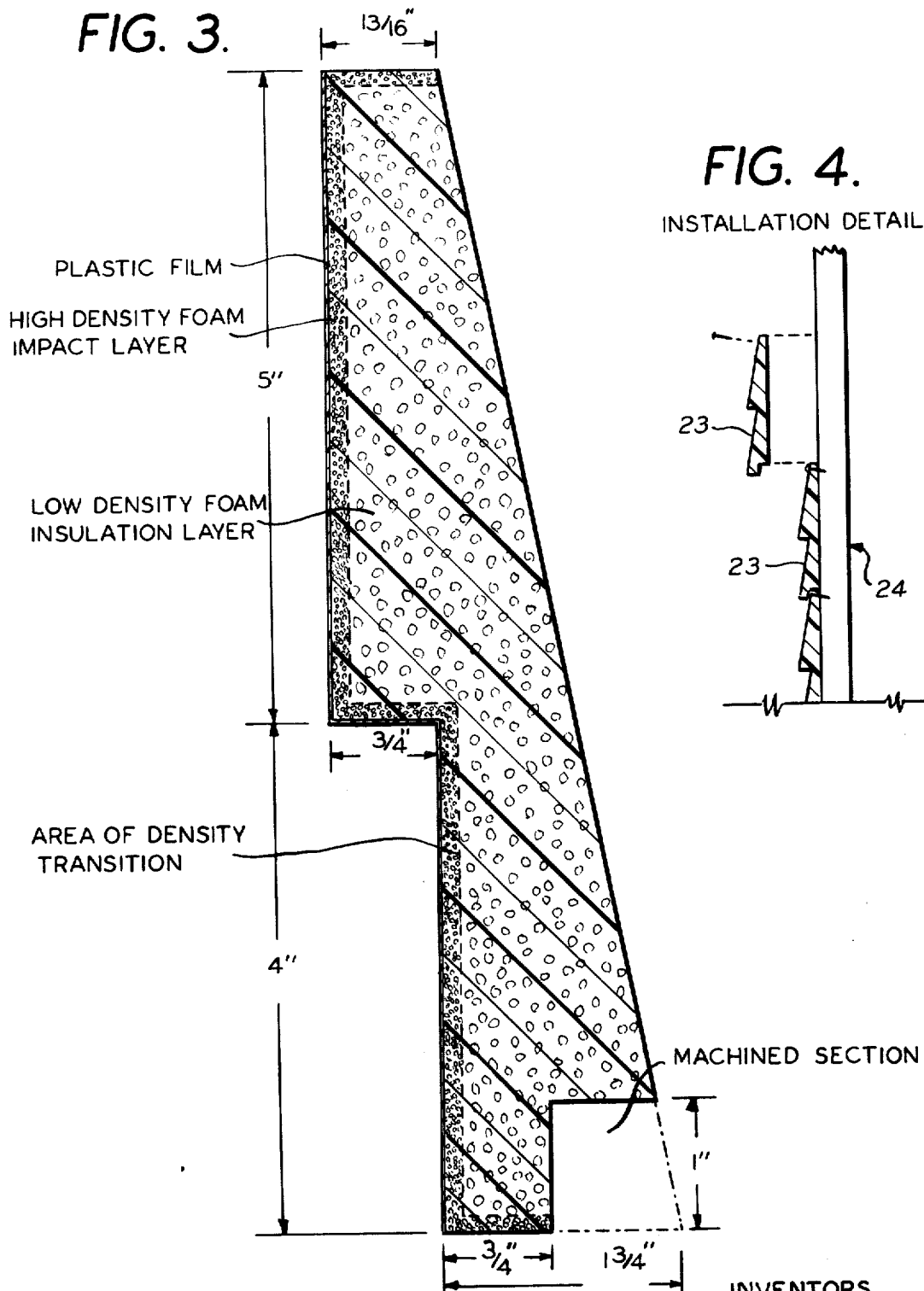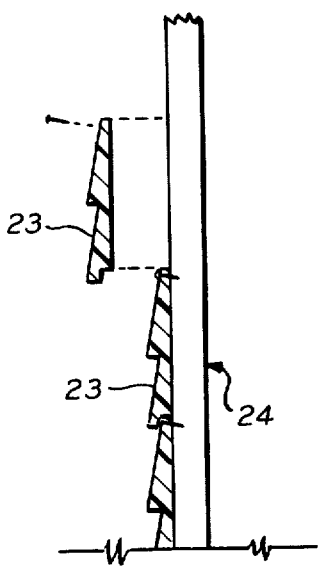

METHOD OF MANUFACTURING A MOLDED COMPOSITE URETHANE FOAM STRUCTURAL PANEL

The invention covers a high quality structural building panel comprising a unique construction of high density and low density urethane foam faced with a weather resistant plastic film or sheet material surface, and with the method of manufacture wherein the supporting urethane foam is molded onto the film instead of laminating the film onto the supporting substrate.

The present invention is briefly concerned with a high quality structural building panel, particularly building siding and with the method of manufacture wherein the supporting urethane foam is molded onto the film instead of laminating the film onto constituting supporting urethane foam substrate. The present invention is an improvement in part, of application Ser. No. 153,604 filed June 16, 1971 entitled "Urethane Elements and Process of Manufacture," inventor Lester V. Ottinger, a joint inventor hereof.

The use of urethane foams and the method of manufacture are well known in the art. The present invention is concerned with urethane foam such as described in "Encyclopedia of Chemical Technology", Kirt-Othmer, Second Edition, Volume 21, pages 84–94, published by Interscience Publishers, a division of John Wiley and Sons, Inc. 605 Third Ave., New York, N.Y.

The present invention is more specifically concerned with a building product and method of manufacture which preferably uses a spray technique wherein the foam is sprayed onto a film and wherein two or more spray banks are used. The building element such as building siding is manufactured continuously and each element comprises at least one course and preferably at least two courses and may comprise three or four or more courses.

The present invention may be readily understood by reference to the drawings illustrating one embodiment of the same:

FIG. 1 shows in some detail the sequence of the integrated manufacturing steps,

FIG. 2 is a transverse cross sectional view of the forming rollers 5 and conveying belts at line a—a of FIG. 1.

FIG. 3 illustrates a preferred finished siding of two courses with some typical measurements.

FIG. 4 shows one typical installation.

Referring specifically to FIG. 1, a film 2 such as "Tedlar" (polyvinyl fluoride) film is unrolled from a holding roll 1. The film may be of any material such as paper, metal, cloth, and so forth but is preferably a plastic film such as "Tedlar," "Teflon" (polytetrafluoroethylene — PTFE), polyester, polyvinyl chloride, acrylic, melamine, nylon, polystrene, polyethylene, polyproplyene, etc. The thickness of the film is preferably about 1 mil to 5 mils such as about 1.5 mils.

The film passes by an infra red heat source 7 where the film temperature is raised to 105°F. to 130°F., preferably 110°F. to about 115°F. The film then passes over a shaping apparatus 3 and under a rigid profile gauge 4 that causes the plastic film to come in contact with the continuously moving open weave belt surface 13. Next a series of rollers 5 tuck the film in the tight corners of the mold's smooth or textured surface.

The film is then heated to a temperature in the range of about 260°F. to 290°F. such as about 275°F. by means of heaters 6 while passing over an air exhaust bed 8. A stationary metal or equivalent mold 20 (See FIG. 2) supports the moving belts 13 and 17. The metal mold under the belt is preferably with ⅛ inch diameter holes 21, and preferably ¼ inch on center. Each product profile for best results requires different sizes and location of the perforations.

The film being in contact with the belt and mold over the high volume air exhaust bed 8 has established on its surfaces an air pressure differential. This pressure differential generated by a negative static pressure, of about 2 to 4 inches of water, in the air exhaust bed impart strong compression forces on the film against the belt and mold surface securing the film in the desired configuration. Frictional resistance is overcome by coating the metal mold surface with a dry lubricant to facilitate belt movement thereover. The polymer application station is immediately positioned after the film has been secured to the configuration of the mold and has reached a temperature in the range of about 260°F. to 290°F. such as about 275°F.

The polymer applicator 22 consists of an initial bank of nozzles 9 that apply the foam formulation that gives the relatively high density foam and a secondary bank of nozzles 10 for the application of a relatively low density backing or core. The foams may be those as described in the above mentioned patent and literature art.

The high density foam is preferably in the range from about 10 to 30 lbs/ft$^3$. The thickness of the high density coat as applied is about 1/16 and ½ inch, such as about ¼ inch. The thickness of the low density foam is preferably in the range from about ¼ to 3 inches, such as 1 inch. Following the application of the back-up low density layer of urethane foam the reacting and volume expanding foam is subjected to an auxiliary hot air blast of 11 in order to expedite the cure and improve the mold detail pickup. The initial high density foam application 9 forms a layer which expands only about 15 to 20 percent of its original volume and does so almost immediately upon contact with the mold.

The low density back-up layer from bank 10 is sprayed simultaneously with a slight overlap of about ¼ to 1 inch, such as about ½ inch. It is obvious that the speed of the mold will determine the thickness of the respective layers for a uniform fixed rate of application from the sprayers. The cured foam thickness of the combined layers is about 1 ¾ inches for the specific product described, namely building siding.

Face layer must be of sufficient "green strength" when layer is applied so that its cell structure is not destroyed by the secondary spray application. The overlap of sprays 9 and 10 blends a small amount of each foam material so that even though the first layer has green strength which would otherwise decrease a bond with subsequent applications, no line of demarcation of layers exists. Thus there is no point or line of structural part weakness due to inadequate bonds of different layers of one with the other. The second layer begins to foam when applied and when unrestrained increases its volume about 20 to 50 times, such as about 30 fold. As it begins to foam, the blast of hot air 11 is directed so that as the heat facilitates foam expansion, the air pressure holds or retards the foam expansion. The hot air blast decreases in intensity in direction of flow so that it is just strong enough to repress cell expansion within the foam without rupturing the cells as their internal pressure increases. The intensity of the blast of hot air as the molded foam leaves the blast is about 10 to 40 percent, such as about 20 percent of the intensity of the blast when the molded foam first contacts the blast.

One specific concept of the present invention is the concept of placing of the supporting substrate onto the film instead of laminating the film onto the supporting substrate. It is possible to maintain support and shaping of the film during processing by two methods: (A) tensioned over a perimeter-type frame, or (B) held in a mold with a vacuum. Once the film is positioned and shaped, the polymer application process described is followed. The roll of Tedlar film is continuously feeding the film under infra-red heaters bringing film temperatures to 260°F. to 290°F. The film may progress into a stretching apparatus that puts tension on the film in both axial directions (90° apart in the same plane as the film). The film then passes under a soft rubber roll that causes the film to come into contact with the continuously moving mold belt surface, as described. The metal mold under the belt is perforated as described.

As the chemical reaction takes place and the urethane foam rises, it passes under an optional back shaping belt 12. The belt suppresses uneven foam expansion by passing under restraining shoe 16 giving a smooth surface and level back to the product. In a few seconds, the moving, continuously formed product has become rigid, the exhaust bed 8 ends thus releasing the air pressure differential on the product. The belt 13 continues on for a few feet then turns downward pulling itself away from the continuously formed product 14. The product moves on to subsequent cutting device 15, side trimming and packaging operations.

Referring specifically to FIG. 2 (taken on line a—a of FIG. 1), metal mold 20 containing perforations 21 supports moving belts 12 and 17. The film 2 is supported by the moving belts in mold 20 and both are snugly positioned in proper contour by the rollers 5.

The basic configuration and measurements preferred are illustrated in FIG. 3. It consists of a 1.5 mil Tedlar surface immediately backed with a 10 to 20 lb/ft$^3$, urethane foam impact resisting layer which has a back side layer of foam with a density change to 1 to 3 lb/ft$^3$, preferably 2 lb/ft$^3$. This part of the foam layer is for stiffness and insulation. The panel product is 9 inches wide giving an appearance of two to four inch wide siding laps when installed.

FIG. 4 illustrates in some detail the installation of siding panels 23 on a supporting structure 24.

The the present invention produces an excellent high quality weather resistant structural building element. Since urethane foam has a negligible water absorption factor, moisture generated swelling which is an inherent problem in wood siding is eliminated. Also the low density urethane has superior insulation properties and consequently eliminates the necessity for additional insulation. For example, 1 inch thickness of urethane foam is equal in insulation value to 2 inches of glass fiber or 2.54 inches of styrene foam or 4.3 inches of vermiculite.

High strength characteristics of the high density surface area — low density interior construction, are maintained while heat conductivity is greatly decreased. Consequently, increased insulation properties are provided over conventional uniform high density urethane parts. This is due to the increase in internal gas bubbles or cells without loss of surface impact resistance.

The present product is at least one half of the weight of current hardboard siding products. This offers advantages in warehouse handling, shipping and installation. The panel produced by the present process has an insulation value of K factor = 0.14 which is the thermal conductivity in BTU / hr./sq. ft. / °F. / inch at 75°F.

The embodiments of the invention in which an exclusive property or privilege is claimed are defined as follows:

1. Process for manufacturing a high quality molded urethane foam structural panel which comprises continuously applying a thin plastic film to a belt which continuously moves along a mold, introducing a relatively high density foamable urethane mixture onto said film from a first spray applicator, subsequently continuously introducing additional relatively low density foamable urethane mixture onto said plastic film from a second spray applicator in a manner that the spray from said second applicator slightly overlaps the spray from said first applicator, and in a manner that the foamable urethane mixture from said first applicator completely covers the foamable urethane mixture from said first applicator, conforming said film to the mold configuration by means of a vacuum, and forming a urethane foam substrate on said plastic film, and then separating said belt from said plastic film supported by said urethane foam substrate.

2. Process as defined by claim 1 wherein said structural product comprises a siding member characterized by having one or more courses.

3. Process as defined by claim 1 wherein said film is heated to a temperature in the range of about 110°F. to 120°F. before being applied to said belt and then heated to a temperature in the range of about 260°F. to 290°F. before forming said foam substrate thereon.

4. Process as defined by claim 3 wherein said vacuum is 2 to 4 inches of water.

5. Process as defined by claim 1 wherein the relatively high density foamable urethane mixture from said first applicator has a final density in the range from about 10 to 30 lbs/ft$^3$.

6. Process as defined by claim 5 wherein the average thickness of the applied relatively high density foamable urethane mixture is about 1/16 to ½ inch, and wherein the average thickness of the applied relatively low density foamable urethane mixture is about ¼ to 1 inch.

7. Process as defined by claim 1 wherein the spray from said second applicator overlaps the spray from said first applicator by about ¼ to 1 inch.

8. Process as defined by claim 1 wherein said structural member comprises a siding member characterized by having two to four courses.

9. Process as defined by claim 1 wherein said plastic film has a thickness of about 1 to 5 mils, wherein said relatively high density foamable urethane mixture is about 10 to 20 lbs ft$^3$, and wherein said relatively low density foamable urethane mixture is about 1 to 3 lbs ft$^3$.

10. Process for manufacturing a high quality molded urethane foam structural product comprising the steps of continuously applying a thin weather resistant plastic film from a roller to an open weave belt which continuously moves along a mold, conforming said belt and said film to the mold configuration by means of a vacuum, introducing a relatively high density foamable urethane mixture onto said film from a first spray applicator, subsequently introducing additional relatively low density foamable urethane mixture onto said film from a second spray applicator in a manner that the spray from said second applicator slightly overlaps the spray from said first applicator, and in a manner that the foamable urethane mixture from said second applicator completely covers the foamable urethane mixture from said first applicator, and finally separating said belt from said film supported by said urethane foam substrate.

11. Process as defined by claim 10 wherein said plastic film has a thickness in the range of about 1 to 5 mils.

12. Process as defined by claim 10 wherein said plastic film is heated to a temperature in the range of about 105°F to about 130°F before being applied to said belt.

13. Process as defined by claim 12 wherein said film is heated to a temperature in the range of about 260° to about 290°F before forming a urethane foam substrate upon said film.

14. Process as defined by claim 10 wherein said relatively high density foamable urethane mixture is about 1 to 3 lbs ft$^3$.

15. Process as defined by claim 14 wherein conditions are adjusted to secure an expansion of said relatively high density foamable urethane mixture of about 15 percent to 20 percent of its original volume, and expansion of said relatively low density foamable urethane mixture is about 20 to 50 fold of its original volume.

16. Process as defined by claim 10 wherein said urethane foam substrate on said film is subjected to a hot air blast prior to separating said belt from said film supported by said urethane foam substrate.

17. Process as defined by claim 16 wherein the intensity of said hot air blast decreases in the direction of movement of said film.

18. Process as defined by claim 14 wherein said urethane foam substrate on said film is subjected to a hot air blast prior to separating said belt from said film supported by said urethane foam substrate.

19. Process as defined by claim 18 wherein the intensity of said hot air blast decreases in the direction of movement of said film.

20. Process as defined by claim 19 wherein the intensity of said hot air blast decreases to about 10 to 40 percent of its original intensity.

* * * * *